(12) United States Patent
Maldonado

(10) Patent No.: US 8,439,628 B2
(45) Date of Patent: May 14, 2013

(54) HEAT TRANSFER ENHANCEMENT IN INTERNAL CAVITIES OF TURBINE ENGINE AIRFOILS

(75) Inventor: Jaime Maldonado, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 699 days.

(21) Appl. No.: 12/683,133

(22) Filed: Jan. 6, 2010

(65) Prior Publication Data

US 2011/0164960 A1    Jul. 7, 2011

(51) Int. Cl.
*F01D 5/00*    (2006.01)

(52) U.S. Cl.
USPC .......................................... 415/115; 416/97 R

(58) Field of Classification Search ................ 416/96 R, 416/97 R, 97 A; 415/115, 116
See application file for complete search history.

(56) References Cited

U.S. PATENT DOCUMENTS

| | | | |
|---|---|---|---|
| 4,655,419 A | 4/1987 | van der Hoeven | |
| 4,787,442 A | 11/1988 | Esformes | |
| 5,361,828 A * | 11/1994 | Lee et al. ................... | 165/109.1 |
| 5,598,990 A | 2/1997 | Farokhi et al. | |
| 5,609,466 A | 3/1997 | North et al. | |
| 5,681,144 A | 10/1997 | Spring et al. | |
| 5,695,320 A | 12/1997 | Kercher | |
| 5,695,321 A | 12/1997 | Kercher | |
| 5,797,726 A | 8/1998 | Lee | |
| 6,273,682 B1 | 8/2001 | Lee | |
| 6,406,254 B1 | 6/2002 | Itzel et al. | |
| 6,464,462 B2 | 10/2002 | Stathopoulos et al. | |
| 6,777,836 B2 | 8/2004 | Tong et al. | |
| 6,957,949 B2 | 10/2005 | Hyde et al. | |
| 7,094,031 B2 | 8/2006 | Lee et al. | |
| 7,334,760 B1 | 2/2008 | Lisy et al. | |
| 7,637,720 B1 * | 12/2009 | Liang ............................ | 416/96 R |
| 2005/0111979 A1 * | 5/2005 | Liang ............................ | 416/97 R |
| 2008/0019840 A1 * | 1/2008 | Cunha ........................... | 416/96 R |

* cited by examiner

*Primary Examiner* — Edward Look
*Assistant Examiner* — Maxime Adjagbe
(74) *Attorney, Agent, or Firm* — Nixon & Vanderhye, P.C.

(57) ABSTRACT

An airfoil includes a leading edge, a trailing edge, a suction side and a pressure side; a plurality of internal cooling cavities extending radially within the airfoil, one of the plurality of internal cavities extending along the trailing edge. The trailing edge is provided with a plurality of coolant exit apertures extending therealong. A plurality of vortex generators is formed on an internal surface of at least one of the pressure and suction sides of the airfoil. The vortex generators are arranged in radially spaced relationship in one of the plurality of internal cooling cavities, extending substantially parallel to and in proximity to the plurality of coolant exit apertures.

20 Claims, 4 Drawing Sheets

United States Patent US 8,439,628 B2

HEAT TRANSFER ENHANCEMENT IN INTERNAL CAVITIES OF TURBINE ENGINE AIRFOILS

This invention relates to gas turbine airfoils and, more specifically, to the enhancement of heat transfer within the internal cavities of the airfoils.

BACKGROUND OF THE INVENTION

Gas turbine components operate at elevated temperatures requiring active cooling in order to protect the components from harsh environments. Traditionally, gas turbine engine components have been cooled by compressed air or in some instances, by steam available from a combined steam/gas cycle. The use of compressed air for cooling purposes, however, comes at the price of reduced engine performance and efficiency. Thus, the challenge remains to identify ways of reducing coolant flow while maintaining component temperatures within stringent requirements.

Traditionally, temperatures of gas turbine components have been maintained within requirements by convection cooling and thermal barrier coatings. Several techniques are applied to enhance convection heat transfer between the coolant and the internal metal surfaces. Among them, pin-fin banks and turbulators are widely used. In this regard, it is known that heat transfer is reduced as the height of a boundary layer develops and grows. Pin-fin banks and turbulators create a disruption in the boundary layer that allows the boundary layer to restart. Since the boundary layer height is greatly reduced with the restart, heat transfer increases relative to the heat transfer prior to the restart. By adding several pin-fin banks or turbulators, the total heat transfer is increased as compared to a smooth surface. Such heat transfer augmentation devices are well-represented in the patent literature. For example, U.S. Pat. No. 6,464,462 describes the use of splitter ribs on the trailing edge of a bucket for increasing heat transfer. U.S. Pat. No. 6,406,254 describes the use of turbulators on the trailing edge of a nozzle, and U.S. Pat. No. 5,609,466 describes the use of pin-fin banks on the trailing edge of a nozzle.

There remains a need for more effective heat transfer enhancement mechanisms within turbine engine airfoils and particularly in confined, hard-to-access areas of the airfoils such as the internal trailing edge cavities.

BRIEF SUMMARY OF THE INVENTION

In one exemplary but non-limiting embodiment, there is provided a turbine engine airfoil comprising a leading edge, a trailing edge, a suction side and a pressure side; a plurality of internal cooling cavities extending radially within the airfoil, one of the plurality of internal cavities extending along the trailing edge, the trailing edge provided with a plurality of coolant exit apertures extending therealong; and a plurality of vortex generators formed on an internal surface of at least one of the pressure and suction sides of the airfoil, the plurality of vortex generators arranged in radially spaced relationship in the one of the plurality of internal cooling cavities, extending substantially parallel to and in proximity to the plurality of coolant exit apertures.

In another aspect, there is provided a turbine engine airfoil comprising a leading edge, a trailing edge, a suction side and a pressure side; an internal cooling cavity within the airfoil; and a plurality of vortex generators formed on an internal surface of at least one of the suction side and said pressure side within the internal cooling cavity, the plurality of vortex generators shaped to shed at least one cooling air vortex in a clockwise or counterclockwise direction.

In still another aspect, there is provided an airfoil comprising a leading edge, a trailing edge, a suction side and a pressure side; an internal cooling cavity within the airfoil; and a plurality of vortex generators formed on an internal surface of at least one of the suction side and the pressure side within the internal cooling cavity, the plurality of vortex generators arranged in at least one radially-extending row and shaped to shed at least one cooling fluid vortex in a clockwise or counterclockwise direction; the plurality of vortex generators each having a configuration chosen from a group consisting of full delta wing, half delta wing, rib winglet, rib winglet pair, and wedge-shaped.

The invention will now be described in connection with the figures identified below.

DETAILED DESCRIPTION OF THE DRAWINGS

Figure 1:
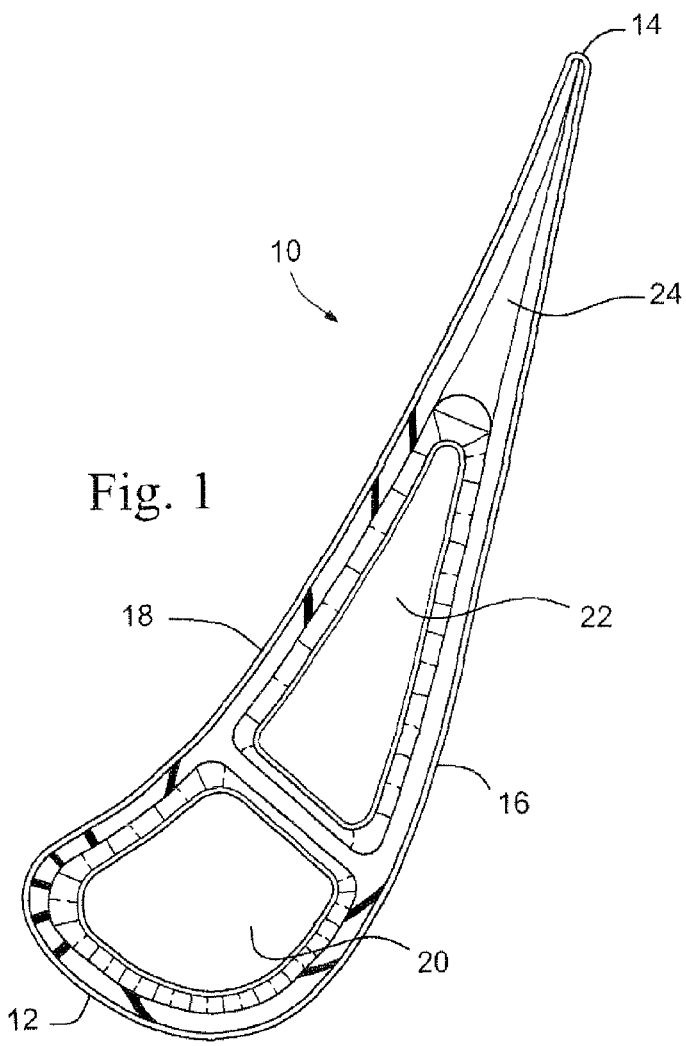
FIG. 1 is a cross-section of a turbine airfoil, illustrating internal cavities formed therein.

With initial reference to FIG. 1, a turbine engine airfoil 10 typically includes a leading edge 12, a trailing edge 14, and convex suction and concave pressure surfaces 16, 18, respectively, extending between the leading and trailing edges. Internal cavities 20, 22 and 24 are formed in the airfoil 10 primarily to permit and control the flow of coolant (typically air but sometimes steam or other fluid) through the airfoil. In an "open" cooling circuit configuration, the cooling air exits the airfoil 10 via the trailing edge cavity 24 and a plurality of exit apertures 26 located along the trailing edge 14 as best seen in FIG. 2.

In accordance with an exemplary but nonlimiting embodiment of the invention, vortex generators may be located on one or both of the internal facing surfaces 28, 30 of the airfoil 10 adjacent or in proximity to the trailing edge exit apertures 26 for augmenting heat transfer within the trailing edge cavity.

Figure 2:
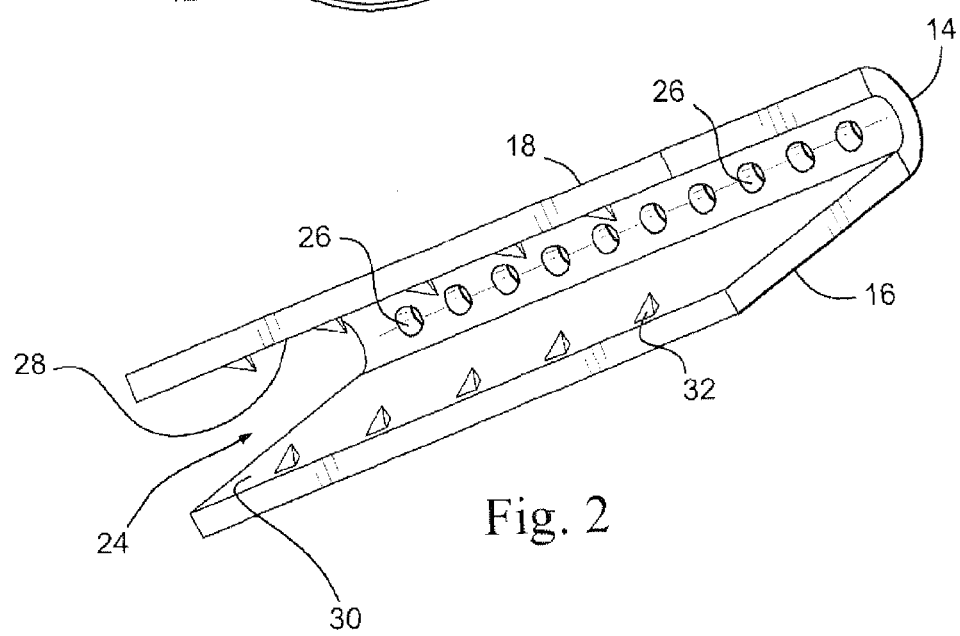
FIG. 2 is an enlarged detail of the trailing edge portion of the turbine airfoil illustrated in FIG. 1, incorporating an exemplary but nonlimiting embodiment of the invention.
Figure 3:
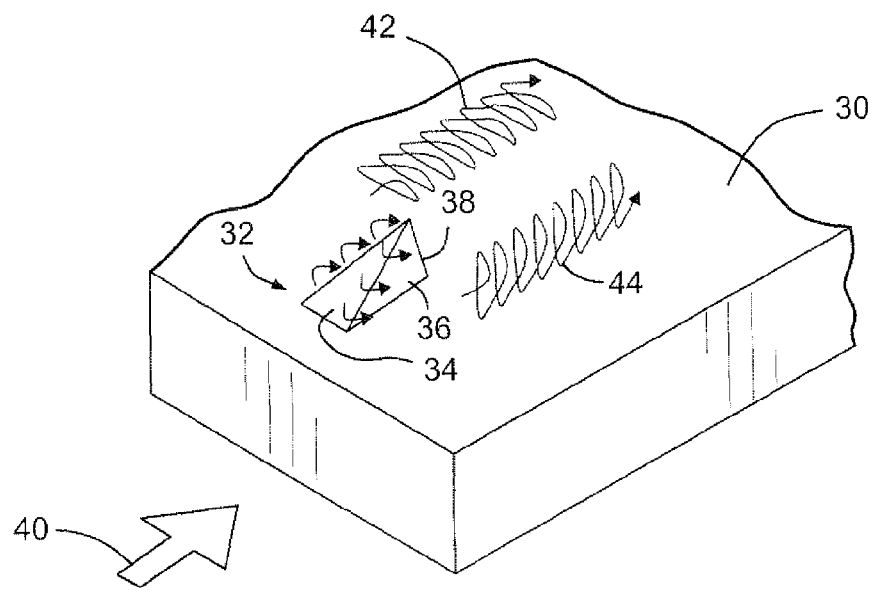
FIG. 3 is a schematic representation of the vortices created by the use of a vortex generator on a surface exposed to cooling flow.

In an example embodiment, a plurality of vortex generators 32 may be in the form of "delta-wings", shown in FIGS. 2 and 3. In this example, the "full" delta wing vortex generator 32 is formed to include an upwardly-inclined, triangular-shaped entry ramp surface 34 flanked by a pair of inwardly inclined side surfaces 36 (one visible in FIG. 3), which converge to a rearward, substantially vertical apex 38. The vortex generators 32 are arranged on internal surface 30 of the trailing edge cavity 24, for example, with the entry ramp surface facing the cooling flow depicted by flow arrow 40. The vortex generators are shown in FIG. 2 in a row, parallel to the trailing edge 14 and proximate the exit apertures 26, and on both of the opposed or facing internal surfaces 28, 30. As shown in FIG. 3, each vortex generator 32 produces a counter-rotating pair of vortices 42, 44 behind the vortex generator, preventing the boundary layer from growing and thus enhancing heat transfer within the trailing edge cavity 24.

Figure 4:
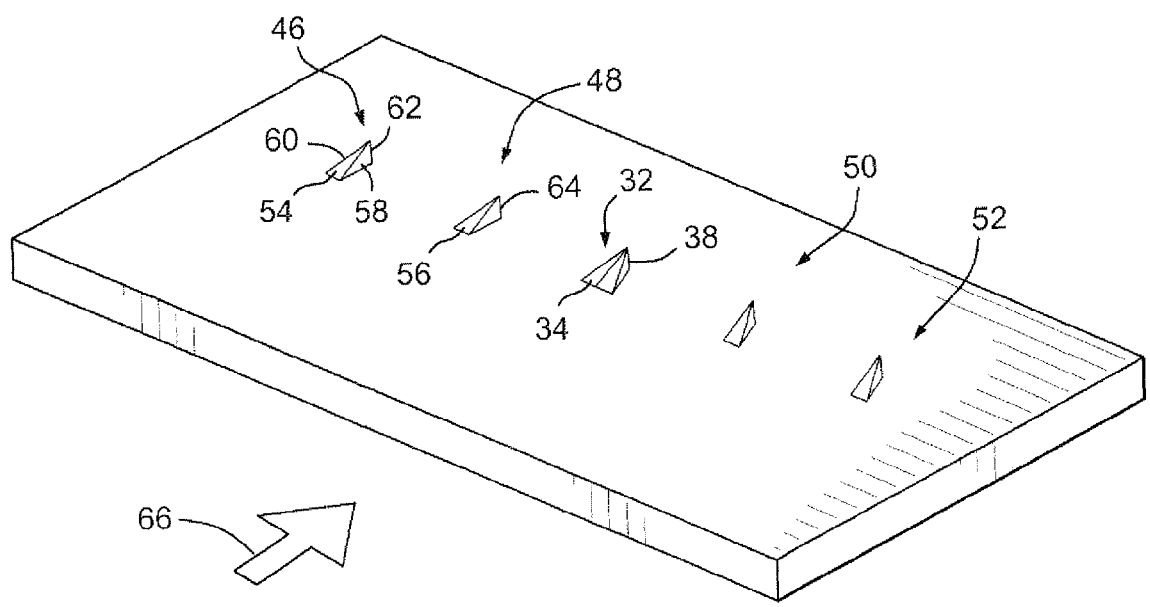
FIG. 4 is a simplified schematic view of a family of vortex generators that may be used on an internal surface of a cavity of a turbine airfoil in accordance with another exemplary but non-limiting embodiment.

FIG. 4 expands on FIG. 3, illustrating the vortex generator 32 flanked by variations of the "full" delta wing configurations of FIGS. 2 and 3. To the left of the vortex generator 32 (as viewed in the direction of coolant flow) are a pair of substantially identical "half" delta wing vortex generators 46 and 48, each consisting essentially of the left half of the vortex generator 32, while to the right of the vortex generator 32, are a another pair of substantially identical "half" delta wing vortex generators 50, 52, consisting essentially of the right half of the vortex generator 32 (for convenience, a center line is shown on the vortex generator 32 to illustrate how a "full" delta wing vortex generator is split to form left and right "half" delta wing vortex generators). More specifically, the entry ramp surface 34 is split to form oppositely facing right-triangular entry ramp surfaces 54 and 56 on the respective vortex generators 46, 48 such that one side of each of the vortex generators 46, 48 is substantially vertical (one vertical side is shown at 58), while the remaining sides (one shown at 60) are inclined and converge to the respective rearward apices 62, 64. The "half" vortex generators 50, 52 are essentially mirror images of the "half" vortex generators 46, 48. In use, cooling air will approach the trailing edge of the airfoil in the direction indicated by flow arrow 66 and will travel up the various entry ramp surfaces 34, 54 and 56, (and mirror image entry ramp surfaces on "half" delta wing vortex generators 50, 52), and fall off, shedding a pair of vortices from the "full" delta wing vortex generator 32 (see FIG. 3), and a single vortex from each of the "half" delta wing vortex generators 46, 48, 50 and 52. It will be appreciated that the "half" delta wing vortex generators 46, 48 produce CCW shed vortices, while the "half" delta wing vortex generators 50, 52 produce CW shed vortices.

It will be appreciated that the vortex generators shown in FIGS. 3 and 4 could also be rotated 180° such that the apices 38, 62, 64, etc. face the cooling flow, and they will still shed vortices substantially as described above, It will be further appreciated that the pattern and arrangement of vortex generators, as well as their respective angles, lengths and heights may vary to achieve a desired balance between vortex generation and pressure losses, depending on specific applications.

Figure 5:
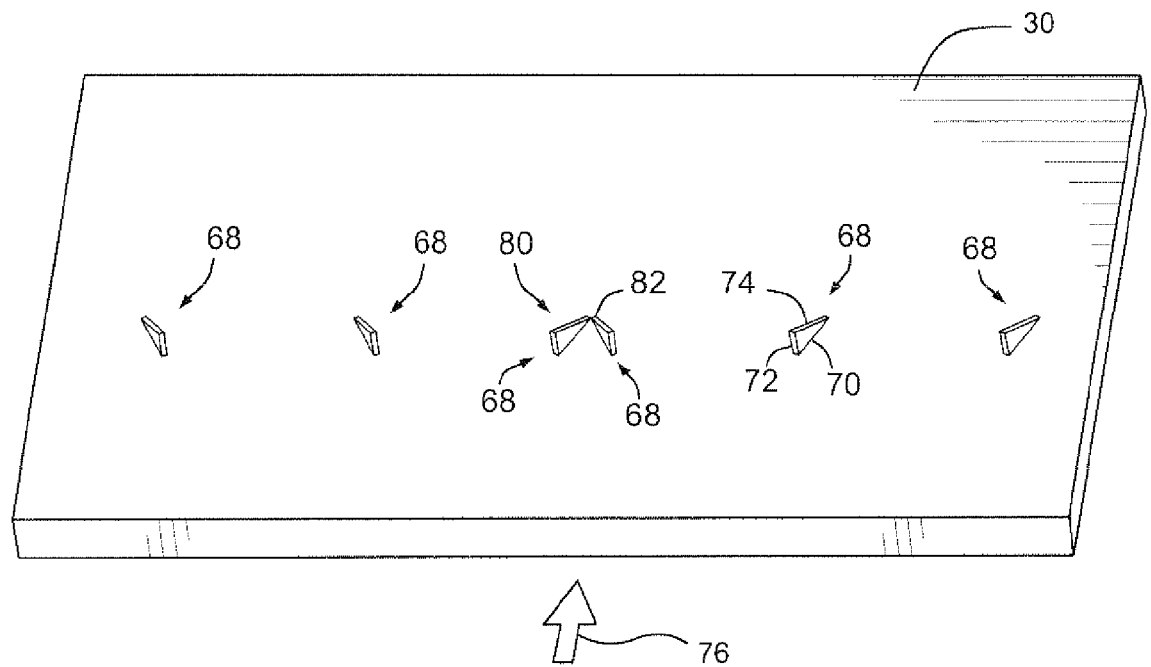
FIG. 5 is a simplified schematic view of another family of vortex generators that may be used on an internal surface of a cavity of a turbine airfoil in accordance with still another exemplary but non-limiting embodiment.

FIG. 5 illustrates additional exemplary but nonlimiting examples of vortex generators that may also be located within an airfoil trailing edge (or other) cavity, in proximity to the airfoil trailing edge. In this example, each vortex generator is composed of one or two ribs or winglets 68. Each rib or winglet 68 is defined by a relatively thin, right-triangle-shaped metal piece including a base 70 and a pair of edges 72, 74. The base 70 may engage the interior trailing edge cavity surface 30 (FIG. 2), with a substantially vertical edge (also referred to as the leading edge of the vortex generator) facing the cooling flow indicated by flow arrow 76, and angled edge 74 inclined downwardly in the downstream direction until it intersects the base 70. A pair of rib winglets 68 may be used together to form a rearwardly-facing arrowhead-shaped vortex generator 80, the rib winglets converging to a point or apex 82. On either side of the vortex generator 80, there are arranged individual rib winglets 68 as described above, the pairs respectively angled in opposite directions away from the arrow-head-shaped vortex generator 80. In this embodiment, cooling air will approach the leading edges 72 of the rib winglets arranged on, for example, internal surface 30 of a turbine airfoil trailing edge cavity 24, impinge upon the leading edges and spill over the rib top edge 74, shedding a single vortex in a CW direction on the left side of rib winglet 80 and a single vortex in a CCW direction on the right side of winglet 80. Cooling air spilling over the center rib winglet 80 will shed a pair of vortices in both the CCW and CW directions.

Here again, the angles, lengths and heights of the rib winglets 68 may vary to achieve a desired balance between vortex generation and pressure losses. In addition, the rib winglets may be rotated 180° from the orientation shown in FIG. 5 and shed vortices substantially as described.

Figure 6:
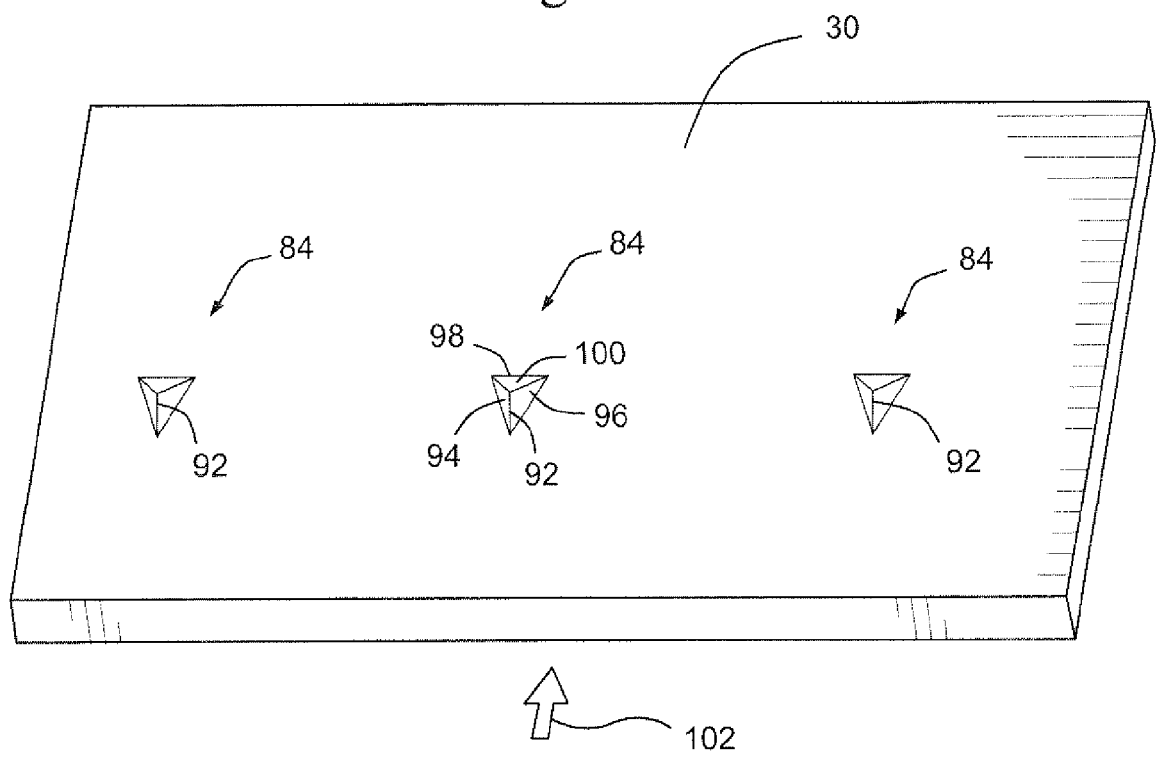
FIG. 6 is a simplified schematic view of another family of vortex generators that may be used on an internal surface of a cavity of a turbine airfoil in accordance with still another exemplary but non-limiting embodiment.

FIG. 6 illustrates a vortex generator configuration in accordance with another exemplary but nonlimiting embodiment. In this example, a plurality of wedge-shaped vortex generators 84 are arranged along the turbine airfoil trailing edge cavity surface 30. Each wedge-shaped vortex generator 88 is generally similar to the "full" delta-wing vortex generators 32 in FIGS. 3 and 4, but rotated 180° degrees, and formed with a less elongated shape. Here, the blunt apex edge 92 faces the cooling flow, while downwardly tapering sides 94, 96 diverge to a relatively wider rearward edge 98 forming the base of the upper downwardly sloping and diverging top surface 100. In use, cooling air will approach the leading or apex edges 92 in the direction indicated by flow arrow 102, and split left and right, forming counter-rotating vortices. Consistent with the description of delta wing vortex generators 32, the vortex generators 84 may also be split in half and arranged as desired to shed a single vortex in a direction depending on the orientation of the vortex generator. As in the previous embodiments, the angles, lengths and heights of the wedge-shaped vortex generators may vary to achieve a desired balance between vortex generation and pressure losses, and as described above in connection with the other examples, the vortex generators 84 may be rotated 180°.

In all cases, the shed vortices exchange fluid between the border of the boundary layer and the cavity wall or surface, which in turn, allows for the reattachment and thinning out of the boundary layer. This effect enhances heat transfer within the cavity or cavities in which the vortex generators are located. The vortex generators described herein are more effective in reducing the height of the boundary layer than pin-fin banks and turbulators and thus also more effective in enhancing heat transfer. Moreover, delta wing, rib-type or wedge-type protrusions can be manufactured on surfaces of hard-to-reach internal cavities of the type of an airfoil trailing edge, by, for example, known investment casting processes to reduce development cost and manufacturing time.

Figure 7:
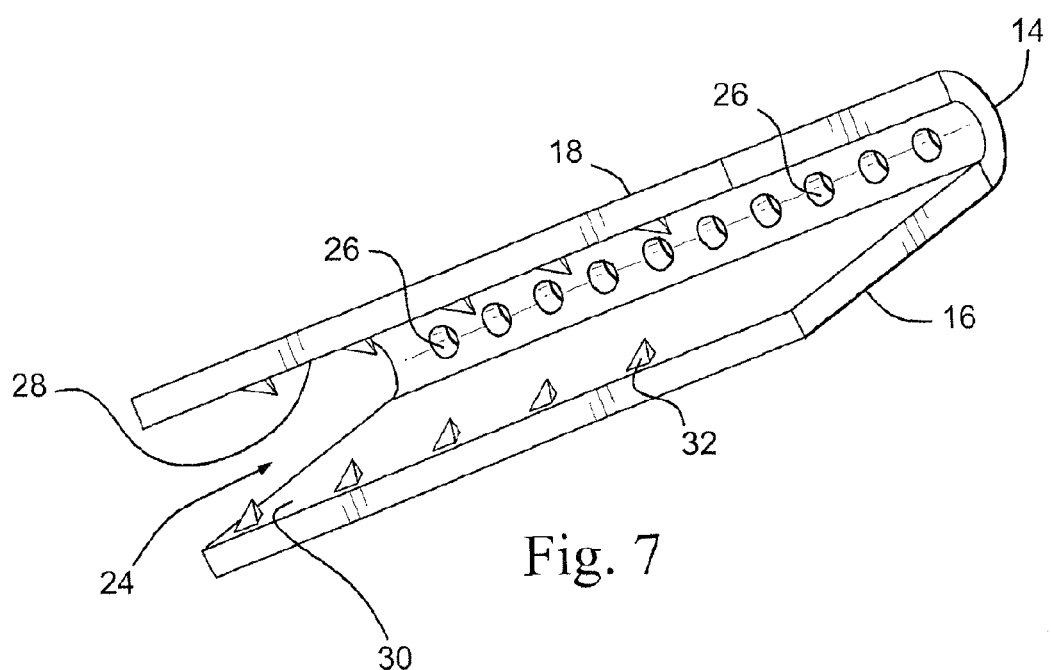
FIG. 7 is an enlarged detail similar to FIG. 2 but showing the vortex generators on the suction side radially staggered relative to the vortex generators on the pressure side.

It will be understood, however, that the use of vortex generators as described herein is not limited to trailing edge cavities in turbine airfoils but may be used in a variety of turbine component cooling applications. In addition, the vortex generators may be employed on one or both of the opposed surfaces within the particular cavity, in single or multiple rows or files. The vortex generators may be arranged in aligned, staggered (see FIG. 7) or random relationship to each other and/or to the vortex generators on the opposed or facing surface within the cavity.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An airfoil comprising a leading edge, a trailing edge, a suction side and a pressure side;
a plurality of internal cooling cavities extending radially within said airfoil, one of said plurality of internal cavities extending along said trailing edge, said trailing edge provided with a plurality of coolant exit apertures extending therealong; and
a plurality of vortex generators formed on an internal surface of at least one of said pressure and suction sides of said airfoil, said plurality of vortex generators arranged in radially spaced relationship in said one of said plurality of internal cooling cavities, extending substantially parallel to and in proximity to said plurality of coolant exit apertures extending along said trailing edge.

2. The airfoil of claim 1 wherein at least some of said plurality of vortex generators have a full delta-wing configuration.

3. The airfoil of claim 2 wherein at least some of said plurality of vortex generators have a half delta-wing configuration.

4. The airfoil of claim 1 wherein said plurality of vortex generators comprise first and second groups of vortex generators formed, respectively, on internal surfaces of both said pressure and suction sides of said airfoil, each of said first and second groups on vortex generators comprising single or multiple rows of vortex generators.

5. The airfoil of claim 1 wherein said plurality of vortex generators are arranged in single or multiple file on said internal surface.

6. The airfoil of claim 4 wherein said first group of vortex generators on said pressure side of said airfoil is substantially radially aligned with said second group of vortex generators on said suction side of said airfoil.

7. The airfoil of claim 4 wherein said first group of vortex generators on said pressure side of said airfoil is radially staggered relative to said second group of vortex generators on said suction side of said airfoil.

8. The airfoil of claim 2 wherein each full delta-wing configuration comprises an upwardly inclined entry ramp surface flanked by a pair of inwardly angled side surfaces that converge at a rearward apex.

9. The airfoil of claim 3 wherein each half delta-wing configuration comprises an upwardly inclined entry ramp surface flanked by an inwardly-inclined side surface and a vertical side surface that converge at a rearward apex.

10. The airfoil of claim 1 wherein said plurality of vortex generators comprises one or more triangular-shaped ribs.

11. The airfoil of claim 1 wherein each of said plurality of vortex generators comprises one or more wedge-shaped components.

12. A turbine engine airfoil comprising a leading edge, a trailing edge, a suction side and a pressure side; an internal cooling cavity within said airfoil extending radially along said trailing edge; a plurality of coolant exit apertures formed in said trailing edge; and a plurality of vortex generators formed on an internal surface of at least one of said suction side and said pressure side adjacent said plural coolant exit apertures within said internal cooling cavity, said plurality of vortex generators shaped to shed at least one cooling fluid vortex in a clockwise or counterclockwise direction.

13. The turbine engine airfoil of claim 12 wherein each of said plurality of vortex generators are shaped to shed a pair of cooling fluid vortices in counter-rotating directions.

14. The turbine engine airfoil of claim 12 wherein some of said plurality of vortex generators are shaped to shed a single cooling fluid vortex and some of said vortex generators are shaped to shed a pair of cooling fluid vortices.

15. The turbine engine airfoil of claim 12 wherein at least some of said plurality of vortex generators have a full delta-wing configuration.

16. The turbine engine airfoil of claim 12 wherein at least some of said plurality of vortex generators have a half delta-wing configuration.

17. The turbine engine airfoil of claim 12 wherein said plurality of vortex generators each comprise one or more triangular-shaped ribs.

18. The turbine engine airfoil of claim 12 wherein said plurality of vortex generators each comprise one or more wedge-shaped components.

19. The turbine engine airfoil of claim 12 wherein said plurality of vortex generators are formed in single or multiple file on said internal surface.

20. An airfoil comprising a leading edge, a trailing edge, a suction side and a pressure side; an internal cooling cavity within said airfoil said internal cooling cavity provided with plural exit apertures along said trailing edge; and a plurality of vortex generators formed on an internal surface of at least one of said suction side and said pressure side within said internal cooling cavity and located adjacent said plural exit apertures, said plurality of vortex generators arranged in at least one radially-extending row and shaped to shed at least one cooling fluid vortex in a clockwise or counterclockwise direction; said plurality of vortex generators each having a configuration chosen from a group consisting of full delta wing, half delta wing, rib winglet, rib winglet pair, and wedge-shaped.

* * * * *

UNITED STATES PATENT AND TRADEMARK OFFICE
CERTIFICATE OF CORRECTION

PATENT NO. : 8,439,628 B2
APPLICATION NO. : 12/683133
DATED : May 14, 2013
INVENTOR(S) : Jaime Maldonado It is certified that error appears in the above-identified patent and that said Letters Patent is hereby corrected as shown below:

In the Specifications:

At column 3, line 48, delete "above, It" and insert --above. It--

At column 3, line 62, insert --72-- after "vertical edge"

Signed and Sealed this
Eighteenth Day of June, 2013

Teresa Stanek Rea
*Acting Director of the United States Patent and Trademark Office*